(No Model.) 2 Sheets—Sheet 2.

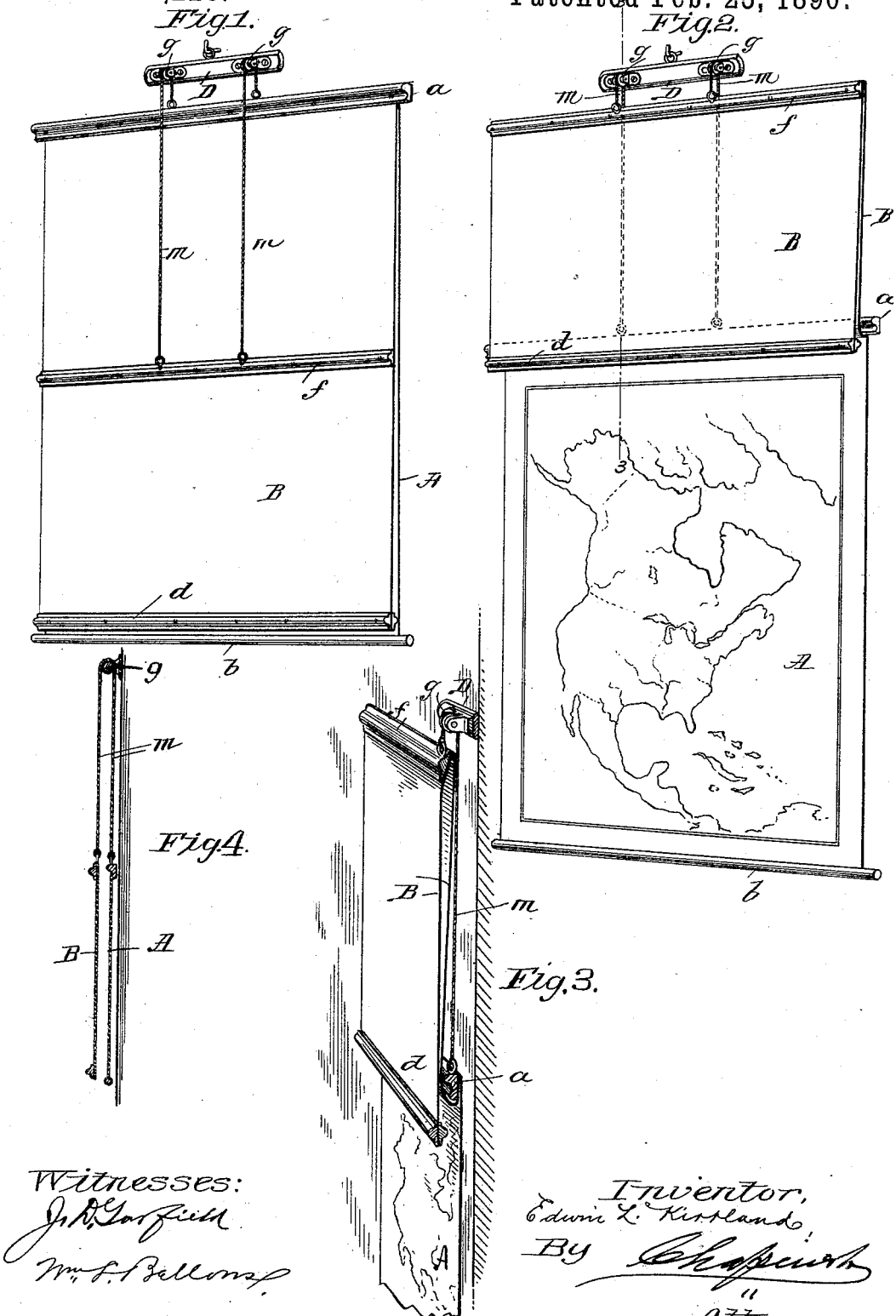

E. L. KIRTLAND.
CURTAINED MAP.

No. 422,228. Patented Feb. 25, 1890.

Witnesses:
J. D. Garfield
Wm. S. Bellows

Inventor
Edwin L. Kirtland,
by Chapin
Attorneys

UNITED STATES PATENT OFFICE.

EDWIN L. KIRTLAND, OF HOLYOKE, MASSACHUSETTS.

CURTAINED MAP.

SPECIFICATION forming part of Letters Patent No. 422,228, dated February 25, 1890.

Application filed May 3, 1889. Serial No. 309,512. (No model.)

*To all whom it may concern:*

Be it known that I, EDWIN L. KIRTLAND, a citizen of the United States, residing at Holyoke, in the county of Hampden and State of Massachusetts, have invented new and useful Improvements in Curtained Maps, of which the following is a specification.

This invention relates to a combined map and a curtain for protecting and concealing the map, the object of the invention being to provide in curtained maps means whereby, on desiring to expose the face or any part of the face of the map by moving the map a given distance, the curtain therefor will be withdrawn and caused to uncover an area having a width greater than the length of movement of the map; and the invention consists in the construction and combination of the map, the curtain, and supporting and connecting means for and between the said map and curtain, all substantially as will hereinafter more fully appear and be set forth in the claims, reference being particularly had to the accompanying drawings, forming part of this specification, in which the curtained map and the manner of its operation are illustrated.

Figure 5:
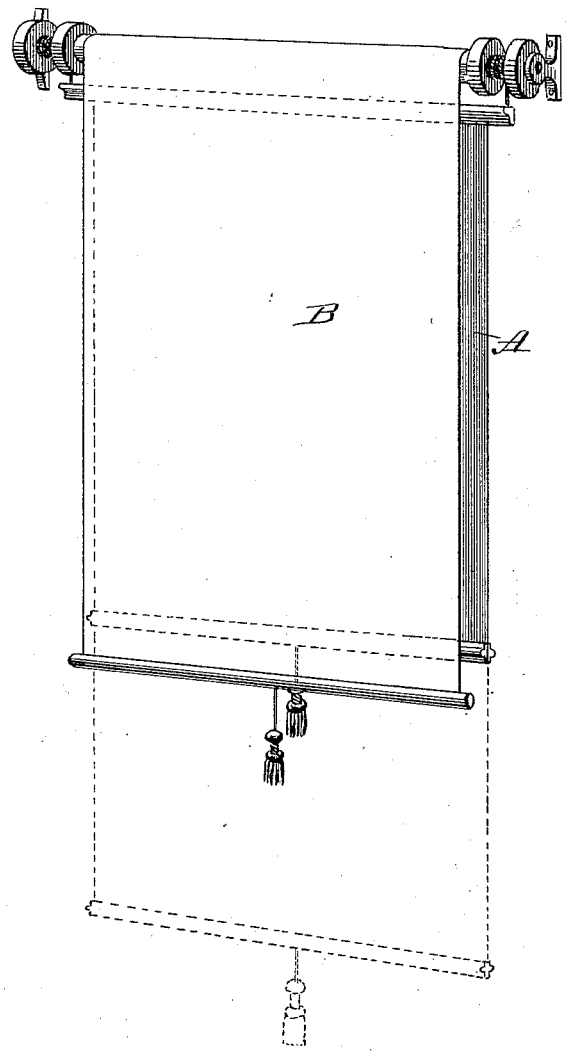
Figures 6, 7:
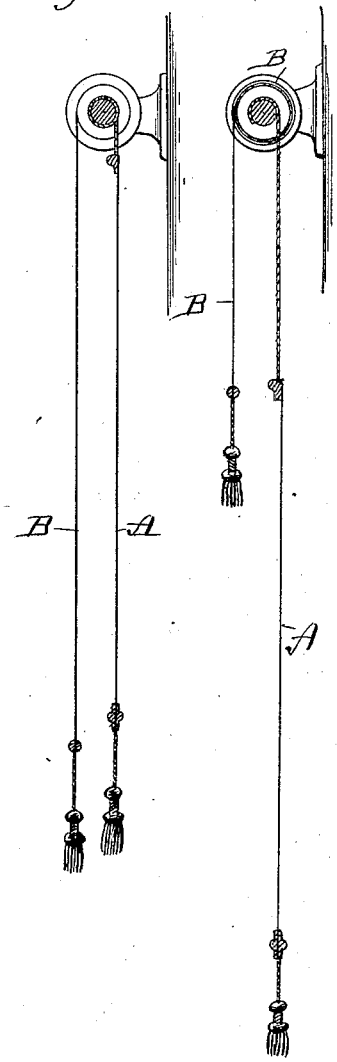

Figure 1 is a perspective view of the curtained map properly suspended, with the curtain thereof shown as covering the map-face. Fig. 2 is a similar perspective view to Fig. 1, but showing the relative positions of the parts when they are moved to uncover the entire face of the map, and Fig. 3 is a sectional and perspective view of the map on a somewhat larger scale than the preceding figures to more clearly illustrate the arrangement and operation of the parts, the plane of the section on which said view is taken being indicated by the line 3 3, Fig. 2. Fig. 4 is a vertical sectional view of a modification hereinafter referred to, and Fig. 5 is a perspective view of a further modification also to be hereinafter referred to, and Figs. 6 and 7 are vertical sectional views of the curtain and map and intervening movable connections shown in Fig. 5, said parts being in different positions in the different views.

As particularly shown in Figs. 1, 2, and 3, the map A, consisting of a rectangular or otherwise suitably formed sheet, at its top is provided with a horizontal strengthening, stiffening, and carrying-strip $a$, of wood or other proper material, and is preferably also provided at its bottom with a similar strip $b$, said strips being firmly secured to the map-sheet in any approved manner.

The curtain B, of suitable flexible material for covering the map and having an area corresponding thereto, is by its upper edge joined to said top carrying-strip $a$ for the map, being also preferably provided with a strip $d$ at its lower edge, and horizontally across its middle another strip $f$ is secured to the curtain.

Above the top of the map on any suitable support—as, for instance, the bar D—is fixed a pair of cord-guiding devices, as rollers $g$ $g$, and to the top strip $a$ of the map cords $m$ $m$ are secured, thence passing over and around said rollers and carried and connected to the said horizontal strip intermediately traversing the curtain.

With the map and curtain parts in such disposition that the curtain covers the entire face of the map, as seen in Fig. 1, on drawing downwardly on the map a given distance a map area will be exposed having a width double that of the downward movement of the map, for, as will be clearly understood, on the downward movement of the map the cord running from its top to the intermediate portion of the curtain draws the latter upwardly as fast and as far as the map is drawn downwardly, and when the map has been drawn down so far that its top is depressed to the place formerly occupied by its middle the part of the curtain which formerly laid over such middle is carried so far above the top of the map that the bottom of the curtain is on the line with the top of the map, the entire face being uncovered. To cover the face of the map by drawing downwardly on the curtain, the map moves upwardly and the curtain downwardly, or when the map and curtain are of equal weight the map may be covered by pressing upwardly on the bottom roll thereof.

In the drawings, two cords $m$ $m$ and rollers therefor on the bar D are shown, such number being deemed requisite for practical and entirely satisfactory results, although the employment of but a single cord, connected to the top of the map and the middle of the curtain in the vertical median line thereof, will insure operative results in a degree, and of course for exceedingly large maps a greater number of cords and guiding devices therefor may be employed.

In Fig. 4 is shown a modification of the curtained map in which the curtain is not directly attached to the map, but showing the latter suspended by its top from one end of the cord, which is thence passed over the roller, and to the returned end thereof the curtain by its top is attached. On drawing on the map as the same moves down the curtain correspondingly moves up, and vice versa, accomplishing the same result as under the construction hereinbefore described.

In Figs. 5, 6, and 7 a further modification is illustrated, the same being an arrangement of the map, the curtain therefor, and a support common to both thereof, whereby substantially the same result is accomplished, and the curtain is shown as adapted to be wound upon the roller in one direction to be raised and to unwind therefrom to be lowered, the end of the curtain being secured to the roller.

The map is provided with flexible connections or cords passed above the same and also wound around the said roller, (on the ends thereof which project outside of and beyond the curtain,) but in the reverse direction to the winding of said curtain, so that on a turning of the roller in one direction, as by drawing on the map, the curtain will be drawn up and wound around said roller, and the supporting-cords for the map at the same time will be unwound from the roller and the map will be lowered, and on causing the roll to turn in the opposite direction, as may be done by drawing downwardly on the curtain as the curtain is unwound from the roll and lowered, the map-supporting cords will be rewound and the map raised and disposed behind the curtain.

While in the specification the curtain and connecting and supporting devices therefor have been particularly mentioned, for the purpose of brevity, in connection with a "map," of course it will be understood that it may as well be employed for sheets or tablets bearing pictures, charts, or other configurations or matter.

What I claim as my invention is—

1. In combination, a map and a curtain for covering the same, and a suitably supported and guided movable connection between and attached to both the map and the curtain, whereby on moving the map through said connection the curtain will be also moved, and vice versa, for the purpose set forth.

2. A map and a curtain therefor, attached to the upper portion thereof, and a cord attached to the map by its intermediate portion passed over suitable guiding means, and connected to said curtain below its top, for the purpose described.

3. The combination, with the bar D, having rollers, of the map or picture bearing sheet having the top strip $a$, and a curtain for covering same, connected to said top strip and having midway thereof the horizontal strip $f$, and the cords $m\ m$, connected to said top strip of the map, thence passed over said rollers to and connected with the said middle strip of the curtain, substantially as and for the purpose described.

EDWIN L. KIRTLAND.

Witnesses:
WM. S. BELLOWS,
G. M. CHAMBERLAIN.